Inventor:
George A. Robinson
by Macleod, Calver, Copeland & Rice
attys.

G. A. ROBINSON.
CARTON BLANK FEEDING MACHINE.
APPLICATION FILED MAY 10, 1916.

1,252,030.

Patented Jan. 1, 1918.
8 SHEETS—SHEET 5.

Inventor:
George A. Robinson
by Macleod, Calver, Copeland & Dike
Attys

G. A. ROBINSON.
CARTON BLANK FEEDING MACHINE.
APPLICATION FILED MAY 10, 1916.

1,252,030.

Patented Jan. 1, 1918.
8 SHEETS—SHEET 8.

Inventor:
George A. Robinson
by MacLeod, Calver, Copeland & Dike
Attys.

UNITED STATES PATENT OFFICE.

GEORGE A. ROBINSON, OF WOLLASTON, MASSACHUSETTS, ASSIGNOR TO PNEUMATIC SCALE CORPORATION, LIMITED, OF QUINCY, MASSACHUSETTS, A CORPORATION OF MAINE.

CARTON-BLANK-FEEDING MACHINE.

1,252,030. Specification of Letters Patent. Patented Jan. 1, 1918.

Original application filed July 7, 1914, Serial No. 849,396. Divided and this application filed May 10, 1916. Serial No. 96,520.

*To all whom it may concern:*

Be it known that I, GEORGE A. ROBINSON, citizen of the United States, residing at Wollaston, county of Norfolk, State of Massachusetts, have invented a certain new and useful Improvement in Carton-Blank-Feeding Machines, of which the following is a specification, reference being had therein to the accompanying drawings.

The invention relates to a new and useful improvement in machines for forming cartons. The present application is a division of an application by me, filed July 7, 1914, Ser. No. 849,396. It has special reference to the manufacture of cartons formed of a single sheet of paper, the blank being folded in a tubular shape to form the body of the carton, and having end flaps to form the bottom and top of the carton.

Preferably a special blank which will be hereinafter described is provided. The blanks are carried by suitable mechanism from a receiving place to a magazine or holder in which they are stacked and from which they are taken one by one. Adhesive is applied to the end sealing flaps and to the side sealing lap and then the blank is transferred to the forming mechanism.

One object of the present invention is to provide means for withdrawing the bottom blank from the stack and feeding it to the mechanism for forming the carton. Another feature of the invention relates to the means for automatically supplying blanks to the magazine, and still another object of the invention is to provide means whereby the supply of blanks to the magazine is controlled by the height of the stack of blanks in the magazine.

The invention will be fully understood when taken in connection with the accompanying drawings and the novel features thereof will be pointed out and clearly defined in the claims at the close of this specification.

Figure 8:
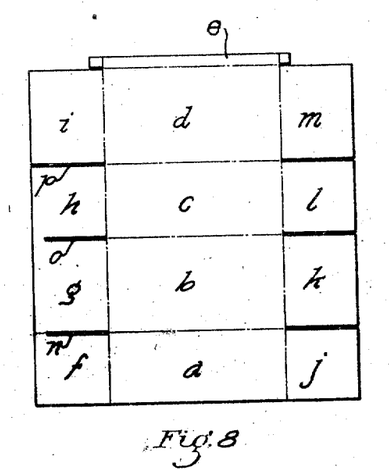
Fig. 8 is a plan of one form of blank which is specially adapted for use in the machine.

In order to better understand the machine, attention is first directed to the preferred form of blank to be employed, and as shown in Fig. 8. The said figure shows the under face of the blank which will be the outer face after the blank is folded on the former block. The blank 1 is cut and scored to form four panel portions $a, b, c, d$ which are to form the four panels of the box, a side sealing lap $e$, four end flaps $f, g, h, i$ to form the bottom of the carton, and four end flaps $j, k, l, m$ to close the top of the carton after it is filled. The blank is scored along the lines indicated by the dotted lines to facilitate folding, and the full lines between the end closing flaps indicate where it is cut through. It is to be noted that the lines of cut $n, o$, between the flaps $f$ and $g$ and between $g$ and $h$ respectively do not extend quite to the outer edge of the flaps, so that there is still a slight union between said flaps $f, g, h$ which can be easily severed at the proper time, while the line of cut $p$ between the flaps $h$ and $i$ and the line of cut between all of the top closing flaps $j, k, l, m$ are cut clear to the outer edge. The reason for this is that it is desired to retain the projecting flaps $f, g$ and $h$ all in better supporting connection with each other and to prevent any one of said three end flaps from dropping below the others while they are in the holder or magazine waiting to be drawn out as will appear more clearly in the description hereinafter. It is not necessary to make any special provision for the flap $i$.

The holder or magazine in which the blanks 1 are stacked consists of a plurality of horizontal rolls 2 spaced apart from each other in form of a grid on which the pile of blanks rests, and four upright corner posts 3 consisting of angle bars which have wings at right angles to each other so that each post will have faces which engage two edges of the blank. The rolls 2 are mounted in vertical plates 4 which are supported by studs 5 projecting from side walls 6 which form a part of the frame of the machine. The blanks are supported on rollers so that the bottom blank may be more easily drawn out from beneath the weight of the other blanks in the stack. It will be noted from the plan view, Fig. 1, that when the blanks are in the stack the bottom end closing flaps $f, g, h, i$ project beyond the supporting rolls 2 of the holder and are unsupported on their under side.

The elevator mechanism for keeping the magazine supplied with blanks is shown in Figs. 2 and 12–16 and will be more particularly described hereinafter, as it is actuated in connection with the gluing mechanism which should be first described. The blanks have to be transferred from the magazine already described to a position where the panels are folded in tubular form and sealed and then the bottom end closing flaps are folded and sealed. The folding mechanism is not shown in the drawings of this divisional application as it is the subject of claims in the original application. The gluing of the side sealing lap and of the bottom end closing flaps takes place before the blank is carried to the forming block, and just before it leaves the magazine. The gluing is all performed on the outer faces of the flaps, that is, on the faces which when the blank is folded will face outward from the block, rather than toward the block so that the block will not become smeared with glue.

The lowermost blank in the stack is first glued as to its bottom forming end flaps $f, h, i$, while the blank is still in the stack, then separator fingers are inserted between the projecting flaps $f, h$ of the lowermost blank and the blank above it, and a gripper advances and seizes the blank by the unglued flap $g$ and pulls it out from the stack, and while this is being done the side sealing lap $e$ is glued, and then the blank is carried to the forming mechanism. The mechanism for doing this work will now be described. See particularly Figs. 1, 2, 4–10.

A shaft 8 is journaled in two parallel bars 9, 10 (see Figs. 3, 4, 5) which are tied together and form a reciprocable carriage, the bars 9 and 10 of the said carriage being formed for a portion of their length with teeth which engage respectively with spur gears 11, 11 mounted on a rocker shaft 12 whereby a reciprocating movement is given to the carriage.

The rocker shaft 12 is actuated by mechanism as follows,—(see Figs. 1, 2 and 3.)

A spur gear 611 is mounted on shaft 12. See Fig. 3. A segment gear 612 is mounted on a rocker shaft 629 and engages with said spur gear 611. A lever 613 is made fast at one end to said rocker shaft 629 and its other end is pivotally connected with one end of a rod 614 whose lower end is connected with a lever 615 fulcrumed on shaft 607, said lever having a roll which engages with a cam path in one face of a cam on shaft 50 said cam not being shown in the drawings, as it is concealed by the cam 604 on the same shaft.

Mounted on the shaft 8 is a spur gear 13 which engages with a stationary rack 14 so that as the carriage 9, 10 reciprocates, the shaft 8 will rotate in one direction or the other according to the direction of travel of the carriage. (See Figs. 3, 4, 5.) Mounted fast on shaft 8 is a yoke lever 15 which carries a pad holder 16 having a segmental face on which are mounted the segmental gluing pads 18, 19 which serve to apply adhesive to the flaps $f, h,$ and $i,$ of the blank. The pad 18 is of a suitable width and location on the holder to apply adhesive to the flap $f$, and the pad 19 is of a greater width so as to apply adhesive to the two adjacent flaps $h$ and $i$. The outer periphery of these pads is concentric with the shaft 8. As the carriage reciprocates, the engagement of the gear 13 with the rack 14 will cause the pads to swing around in the arc of a circle.

Figure 3:
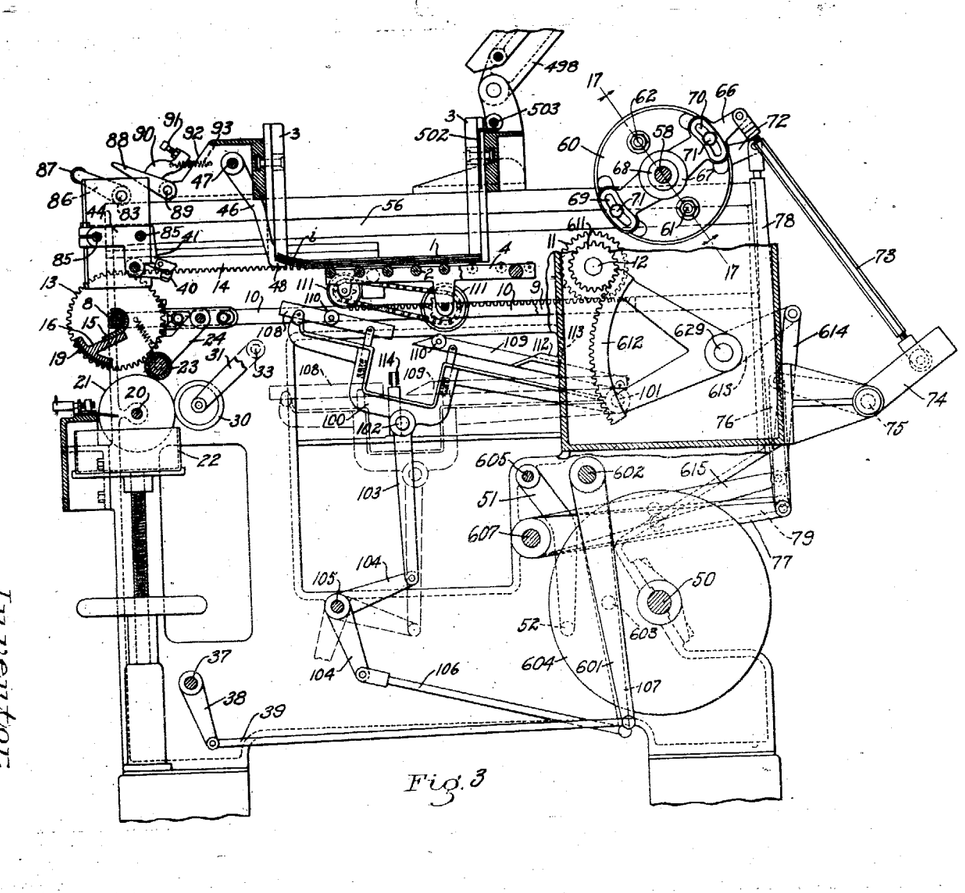
Fig. 3 is a section on line 3—3 of Fig. 1.
Figure 4:
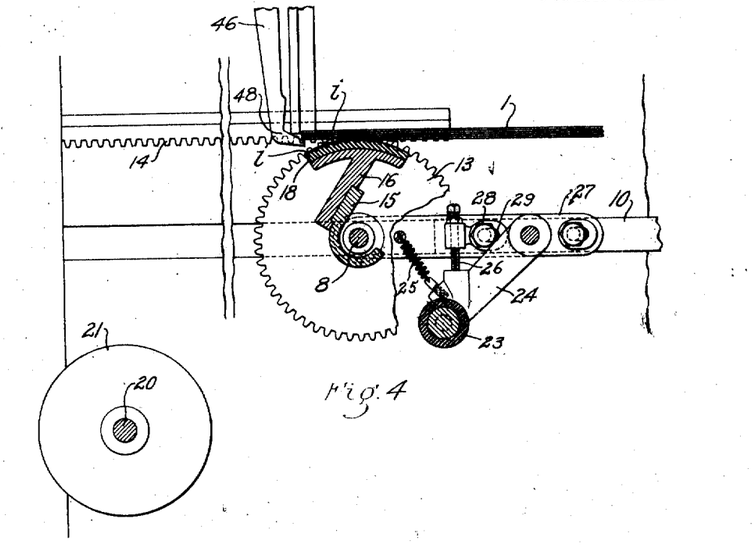
Fig. 4 is a detail view of the gluing mechanism for the end forming flaps partly in section and of the mechanism for separating the projecting flap of the lowermost blank from the others in the stack, taken just after the beginning of the act of separation by bending down the flaps of the lowermost blank.
Figure 5:
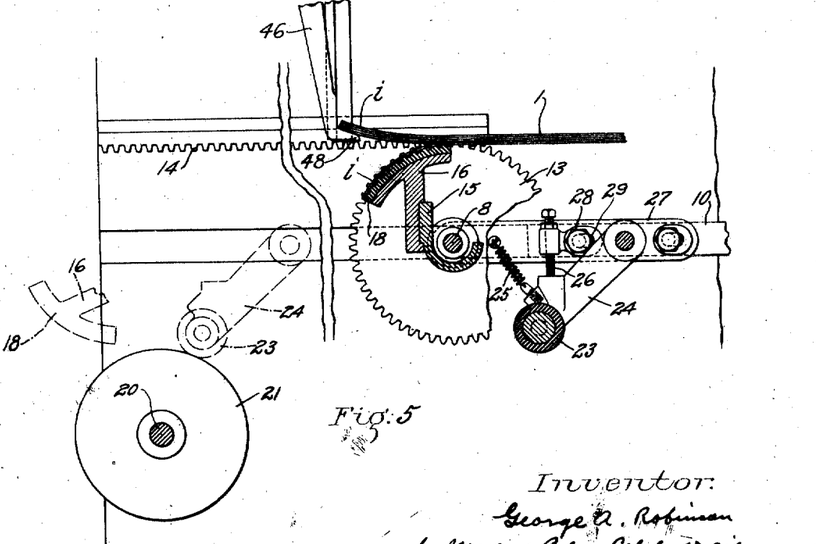
Fig. 5 is a view of the same parts as in Fig. 4 at a little later stage in the operation, when the flaps of the bottom blank are more fully separated from the flaps of the superposed blanks, by bending, but before the blank is drawn out of the stack.
Figures 6, 7:
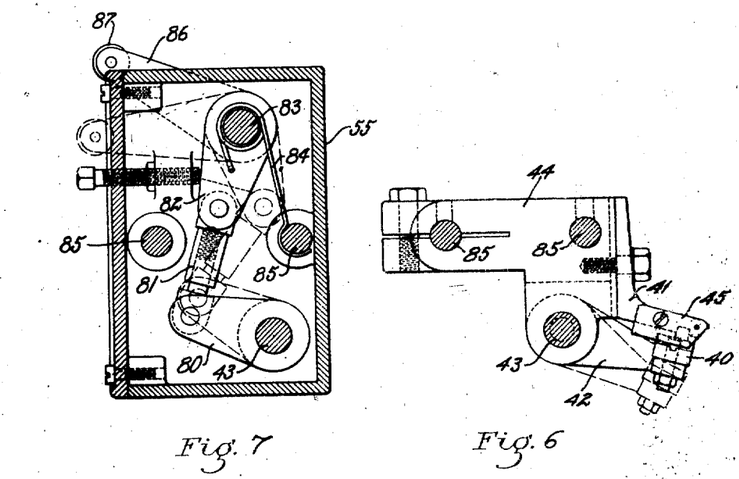
Fig. 6 is an enlarged view of the jaws for withdrawing the blanks from the magazine.
Fig. 7 is a section through the case which contains the mechanism for operating the jaws.

Mounted on a shaft 20 journaled in the frame of the machine is a glue feed roll 21 which dips into a glue receptacle 22. Said glue feed roll 21 is continuously driven. A gluing roll 23 is journaled in the swinging ends of the two parallel levers 24 which are respectively pivoted at their other ends to the carriage. A spring 25 under tension which is fastened at one end to the bar 9 and which is fastened at its other end to one of the levers 24, and a similar spring connected with the bar 10 and the other lever 24 tend to pull the levers 24 and the roll 23 upward. A stop screw 26 limits the upward position of each of the levers 24 and of the roll 23. Said stop screws 26 are mounted in brackets 27 which are adjustably secured to the bars 9, 10 respectively by means of screws 28 which engage respectively with a horizontally elongated slot 29 in the bracket. When the carriage 9, 10 is in its rearward position as shown in Fig. 3, the gluing roll 23 will bear against the glue feed roll 21 and the gluing pads will extend rearwardly. When the carriage moves forward, that is, to the right as viewed in Fig. 2, the glue pad holders and pads will, by reason of the rotary movement of the spur gear 13, sweep forward and then up and over into the position shown in Fig. 5, and in so doing the outer faces of the pads will wipe along over the periphery of the glue feed roll 23, the said glue feed roll yielding backward to permit the pads to sweep past, and then the springs 25 will bring the levers 24 and pads back into the position shown in Fig. 5 with the levers 24 bearing against the stop screws 26. The driving mechanism of the carriage 9, 10 is geared in such manner that the surface speed of rotation of the pads 18, 19 will be the same as the speed of horizontal travel of the carriage. When the carriage moves forward, that is, to the right as viewed in Fig. 2, the continued onward movement of the carriage will bring the pads first into the position shown in Fig. 4 and thence into the position shown in Fig. 5, and in so doing the pads will wipe the under surface of the flaps $f$, $h$, $i$. The flaps of the lowermost blank will stick to the pad and be bent down as shown in Fig. 5 and the foot 48 of the lever 46 which will have been moved back clear of the stack previously to the engagement of the glue pad with the lowermost blank will follow in behind the pad to engage the under side of the flaps of the blank next above the one engaged by the pad as shown in Figs. 4 and 5; and as will be described hereinafter. On the return movement of the carriage the pad holders and pads will rotate backward but the separator foot 48 will still remain engaged with the flap of the blank next above the lowermost as shown in Fig. 5.

Figures 11, 17:
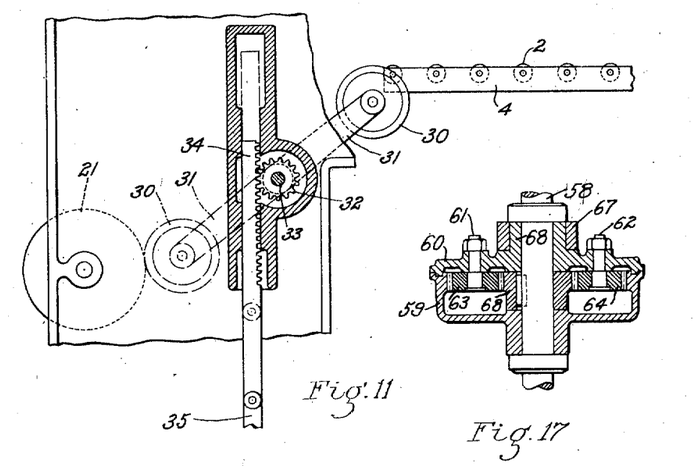
Fig. 11 is a side elevation partly in section, showing mechanism for applying glue to the sealing lap.
Fig. 17 is a sectional view on line 17—17 of Fig. 3, showing a portion of the mechanism for driving the jaws which withdraw the blank from the magazine.
Figure 12:
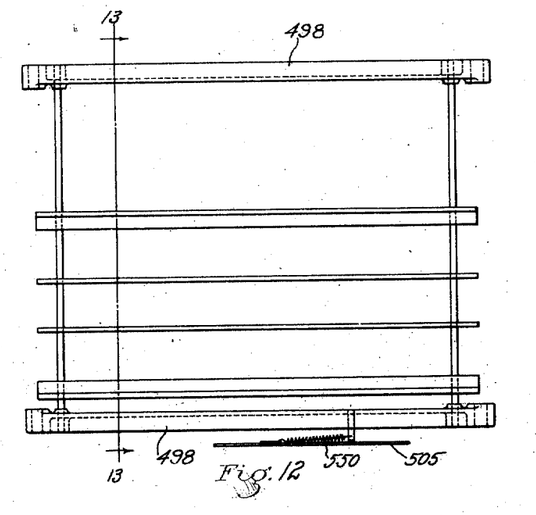
Fig. 12 is a plan view of the chute for the blanks from the top of the elevator to the magazine.
Figure 13:
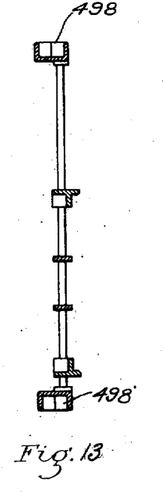
Fig. 13 is a section on line 13—13 of Fig. 12.

A narrow glue roll 30 of sufficient width of periphery to glue the narrow sealing lap $e$ is journaled on one end of a lever 31, the other end of said lever being mounted on a rocker shaft 33 in the frame of the machine. Means are provided for rotating the shaft 33 in a direction to swing the lever 31 forward and up to bring the glue roll 30 into position where when the lowermost blank is drawn out from the holder after the end forming flaps have been glued the sealing lap $e$ will trail over the periphery of the glue roll 30 and thereby apply a strip of adhesive to the said lap, and the return rocking movement of the shaft 33 will bring the roll 30 back into engagement with the glue feed roll 21. The mechanism for thus rocking the shaft 31 is as follows:

On the other end of shaft 33 from that which carries the glue roll 30 there is mounted a spur gear 32 which engages with a vertical rack 34, (see Figs. 2 and 11) which moves in guide ways in the frame. One end of a connecting rod 35 is pivotally connected with the lower end of rack 34, the other end of said rod being pivotally connected with an arm 36 mounted on a rocker shaft 37. An arm 38 also fast on said rocker shaft 37 is pivotally connected with one end of a rod 39, the other end of said rod being connected with a cam lever 601 which is pivoted at 602 and carries a roll 603 which engages with a cam 604 on shaft 50. See Figs. 2 and 3.

The means for gripping and pulling out the glued bottom blank from beneath the others consists of two jaws, 40, 41, the lower one of which 40, is mounted on a lever 42, pivoted on shaft 43 mounted in a holder 44 (see Fig. 6) so as to open and close with relation to the upper jaw 41 which is fixed so far as opening and closing is concerned. The fixed upper jaw 41 is secured to the angular holder 44 consisting of two parallel vertical plates which form opposite ends of the holder and in which the shaft 43 is mounted. The jaws and holder are mounted on a reciprocable carrier which moves them up to grip the blank and back again with the blank.

In order not to smear the jaws with the glue, they are arranged to grip the unglued flap $g$, only and means are provided to complete to the outer edge the slits $n$, $o$, which are between the flap $g$ and the adjacent flaps $f$, $h$ respectively at the same time that the flap $g$ is seized by the jaws, as there is no further need of retaining the connection. For this purpose, the fixed jaw 41 is provided with cutter blades 45 at opposite sides of the jaw between which the movable lower jaw 40 enters when the jaw closes. The cutters 45 are spaced just far enough apart to aline with the slits *n*, *o*, so as to complete the cut on the same line, but the jaws will close in on the flap *g* and firmly grip it.

As the blanks lie in the stack, the flaps of the lowermost blank are overlaid by the flaps of the blank above and it is necessary to in some way provide a clearance space between the flap *g* and the overlying flap in order to permit the upper jaw of the gripper to enter and obtain a grip. Advantage is taken of the fact that as the glue pads 18, 19 roll over the flaps *f* and *h* the glue will cause the flaps to slightly adhere to the pads and be pulled down. This allows the insertion of a separator lever between the downwardly bent glued flaps *f*, *h* and the overlying flaps of the carton above it so as to lift the overlying flaps enough to admit the upper jaw 41. The separator mechanism shown for the purpose above described is as follows: (See Figs. 3, 4, 5). Levers 46 mounted on a rocker shaft 47 are each formed with a foot 48, and are so located that they will be rocked by the shaft 47 in such a way as to cause the feet 48 of the levers to enter between the slightly downwardly curled glued flaps *f*, *h* and the flaps of the overlying blank after the flaps have been glued but before the jaws 40, 41 have advanced far enough to grip the flap *g*. By the time the jaw 41 is ready to pass between the flap *g* and its overlying flap, the said overlying flap will be lifted in the manner above described. The shaft 47 is actuated by means of a cam (not shown) on shaft 50, acting through lever 51 which has at one end a roll 52 engaging with the said cam, its other end being fast on a rocker shaft 605. Said cam is not shown, being behind the cam 604 shown in Fig. 2. Mounted on said rocker shaft 605 is a lever 53 whose other end is pivotally connected with one end of a rod 54 which in turn is pivotally connected with an arm 606 on shaft 47. (See Figs. 2 and 3.)

The carrier for the gripper jaws, when in its starting position, is at a point intermediate its most forward and its most backward position, and it first moves forward to grip the blank, then it moves back to the rearmost position, to pull the blank clear of the stack so that the ungripped end of the blank will fall onto a movable support beneath, then the carrier will move forward again still gripping the blank and pushing it along on said support beneath the stack holder, moving nearly as far forward as on its first forward stroke, but preferably not quite as far, so as to position the blank on said support while the support is stationary, then the jaws will relax their grip and the carrier will move back to its original starting position ready for the next blank and the lever 46 will be turned back to withdraw the foot 48 from the stack. The said movable support will be caused to descend and deposit the blank on a track, and mechanism will then cause it to be positioned beneath the former block ready to be folded.

The jaw carrier consists of a box 55 mounted on tie rods 85 which are carried by two reciprocable racks 56 and which are actuated by gear 57 mounted on a rocker shaft 58 whose rocking is produced by mechanism to be hereinafter described so as to give the necessary throw of varying stroke to the jaw carrier previously referred to. See Figs. 1, 2, 3, 6 and 7.

An internal gear 59 and a plate 60 are both loosely mounted on shaft 58 and are dove tailed together by a sliding tongue and groove fit so that one may rotate independently of the other. See Figs. 1, 2, 3 and 17. Two studs 61, 62 pass through the plate 60 diametrically opposite to each other, being firmly clamped to the plate by a nut on the threaded end thereof and a shoulder which is drawn against the inner face of the plate when the nut is set up. Two pinions 63, 64 are mounted loosely on said studs 61, 62 respectively, and both pinions engage with a pinion 65 fast on shaft 58.

A lever 66 is formed with a bearing 67 through which the hub 68 of the plate 60 passes loosely, the said lever having arms with elongated segmental slots 69, 70 concentric with the shaft 58 and diametrically opposite each other. The lever 66 is clamped to the plate 60 by bolts 71 which pass through the said segmental slots and into the plate 60. The elongated segmental slots permit adjustment of the lever 66 with relation to the plate 60.

Lever 66 is pivotally connected with one end of a connecting rod 73, (see Figs. 1, 2 and 3) the other end of said rod being connected with one arm of a bell crank lever 74, fulcrumed on stud 75, the other arm of said bell crank 74 being pivotally connected with one end of a connecting rod 76, whose other end is pivotally connected with one end of a lever 77, said lever 77 being fulcrumed at its other end on a stud 607 and carrying intermediate its ends a roll which engages with a cam path in a double cam (not shown) on shaft 50, which thereby actuates the lever 66, plate 60, pinions 63, 64, and 65 and shaft 58, the internal gear 59 being controlled by the arm 72 and its connections. Said cam is behind cam 604 on shaft 50.

The lever arm 72 which projects from the internal gear 59 is connected pivotally with one end of a connecting rod 78 whose other end is pivotally connected with one end of a lever 79 which is fulcrumed at its other end on stud 607 and carries intermediate its ends a roll which engages with a cam path in said double cam which actuates lever 77. This last cam through its said connection actuates lever 72, internal gear 59, pinions 63, 64 and 65 and shaft 58. The rotation of shaft 58 actuates gear 57, racks 56 and the jaw carrier.

Said cam which actuates the lever 66 and the lever 72 makes one rotation for each complete four part cycle of movement of the jaw carrier previously described. The cam is so constructed as to its acting faces that the cam face which actuates the internal gear 59 will rotate shaft 58 first in one direction through an arc sufficient to give the jaw carrier the forward stroke from its initial position far enough to bring the grippers to engage the blank, then rotate the shaft in the reverse direction. At the same time that the internal gear 59 begins its reverse movement, the plate 60 will begin to rotate in a direction opposite to the rotation of the internal gear, and their combined movmeent will bring the jaw carrier back to the full rearward position, thus drawing the blank completely out of the pile. Then the continued action of said cam will cause the plate 60 and internal gear 59 to reverse their directions of rotation and reverse the rotation of shaft 58, and move the jaw carrier forward nearly to the same forward position where it gripped the blank, but not quite so far forward, then back to the starting point by the action of the internal gear 59.

The jaws are normally retained closed. Means are provided to open the jaws on the first forward stroke so as to receive the flap of the blank between them, then to close the jaws onto the flap and retain the grip until the end of the second forward stroke, that is, until the blank is deposited on the tilting support beneath the magazine or stack holder. The said mechanism is as follows: See Fig. 7. A lever 80 is made fast to shaft 43 on which the movable jaw 42 is mounted. Said lever is pivotally connected with one end of a rod 81 whose other end is pivotally connected with one end of a lever 82 which is mounted fast on a rocker shaft 83. The connecting rod 81 thus makes a sort of toggle joint with the lever 82, and when the rod 81 and the lever 82 are in a straight line with each other as shown in full lines in Fig. 7 the jaws 42, 45 will be closed together. A spring 84 coiled around the shaft 83 and connected at one end with the lever 82 and connected at its other end with a stud 85 is under tension and tends to hold the toggle joint in the position for closing the jaws. A lever 86 made fast at one end to the rocker shaft 83, outside of the box 55 extends rearwardly and upwardly and carries at its free end a roller 87. A\rm 88 is mounted on a rocker shaft 89 and projects rearwardly and upwardly. See Figs. 1, 2, 3.

An arm 90 projects from the cam 88 and carries a stop pin 91, preferably adjustable, which engages a fixed abutment 92 to limit the upward swing of said cam 88, and is normally held in its backward position by a spring 93. The spring however yields to allow the cam 88 to turn down under pressure. When the jaw carrier moves forward from its starting point the roller 87 engages with the cam 88, and rides under it and thereby tips down the rear end of said lever 86 and rocks the shaft 83. This bends the toggle joint formed by the rod 81 and lever 82 as shown in dotted lines in Fig. 7 thereby rocking the shaft 43 and opening the lower jaw 42. The jaw will remain open until the jaw carrier has moved forward far enough for the roll 87 on lever 86 to pass out from engagement with the cam 88 and the parts are so adjusted that the said disengagement will not occur until the jaws have moved their full forward stroke to receive the flap of the carton blank between them. When the disengagement from the cam 88 occurs, the spring 84 will close the jaws into gripping engagement with the flap of the blank and retain the grip until positively disengaged.

When the jaw carrier moves back from the first forward stroke the roll 87 on lever 86 will engage the upper side of the cam 88 and turn said cam 88 down, pulling back the stop pin 91 against tension of the spring 93, without opening the jaws, but when it goes forward again the roll 87 on lever 86 will again engage the under side of the cam 88 and open the jaws. During this second forward stroke the jaws will push the carton blank forward on the support beneath the stack holder.

The movable or tilting support beneath the stack holder to which reference has been made is as follows: (see Figs. 1, 2 and 3.) Two yoke levers 100 are each fulcrumed at one end on a stud 101 on which the said yoke can rock, its other end being free to move up and down. Each yoke lever is formed with a downwardly extending U-shaped portion intermediate its ends, and the base of this U-shaped portion is pivotally connected at 102 with the upper end of the rod 103, the lower end of said rod 103 being pivotally connected with one arm of a bell crank lever 104 fast on shaft 105, the other arm of said lever 104 being pivotally connected with one end of a rod 106, the other end of said rod 106 being connected with one end of a lever 107 whose other end is pivoted on shaft 602 and carries intermediate its ends a roll which engages with a cam (not shown) on shaft 50. See Fig. 3.

The upper side of each yoke lever 100 is provided with lugs which support two rails 108, 109, said rails 108 and 109 being in alinement with each other, but with a space between their adjacent ends to allow them to straddle parts of the machine which would otherwise interfere with their movement. See Figs. 1, 2 and 3. The two sets of rails 108, 109 are parallel with each other and support transverse rolls 110 to receive the carton blanks when they are removed from the stack. At the time when the jaws draw the blank from the stack, the yoke lever 100 will be in the tilted position shown in Figs. 2 and 3 and the rear end of the blank will drop down onto the rails 108 while the forward end will be in the grip of the jaws. On the next forward movement of the jaw carrier after the blank has been pulled out of the stack, the blank will be pushed by the jaws back on the said support until the rear end is pushed onto the rails 109. At this point the yoke will rise slightly above the position shown in Fig. 3 enough for the rolls 110 to raise the blank into engagement with friction feed rolls 111 and the action of said feed rolls 111 will carry the blank farther back until the rear end of the blank rests on the bases 112 of angular rails which extend lengthwise of the machine, the upright portions 113 of said rails 112 serving as edge guides for the blank in its subsequent travel to the forming block. The feed rolls 111 are continuously driven by any suitable means. In the machine shown in the drawings they are driven by shaft 143 through suitable connections. See Fig. 1.

Figure 1:
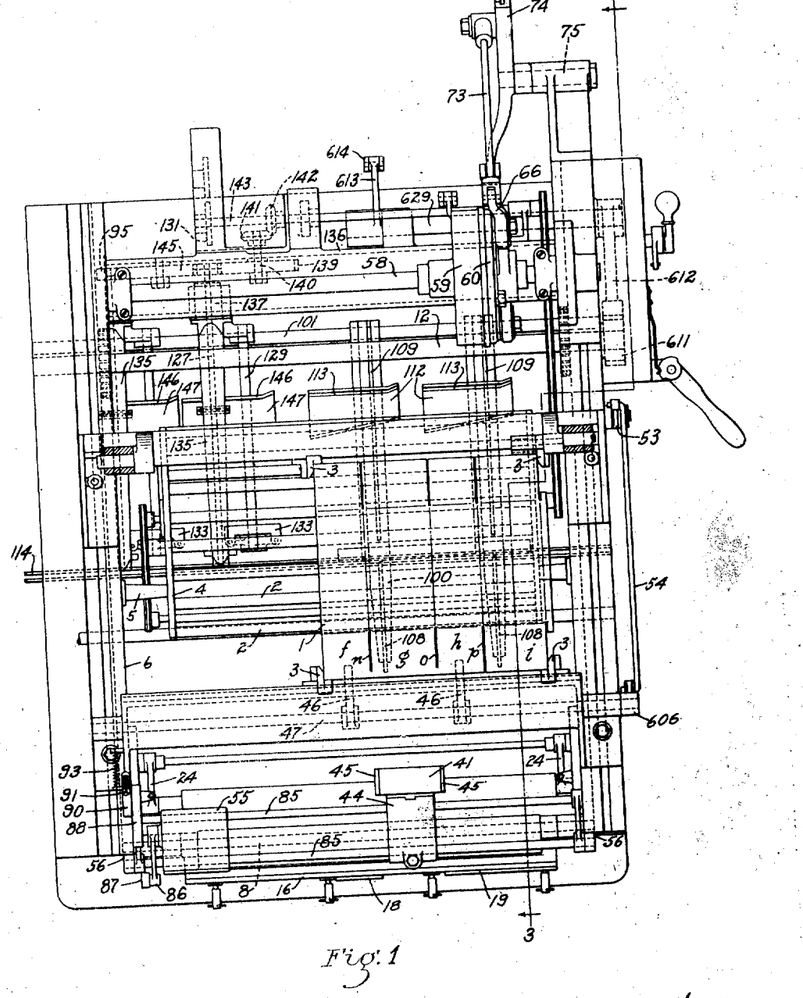
Figure 1 is a plan view of a machine embodying the invention, the elevator mechanism for carrying the blanks to the holder and certain of the overhead mechanism being removed and also omitting the mechanism for forming the blank into a carton.
Figure 2:
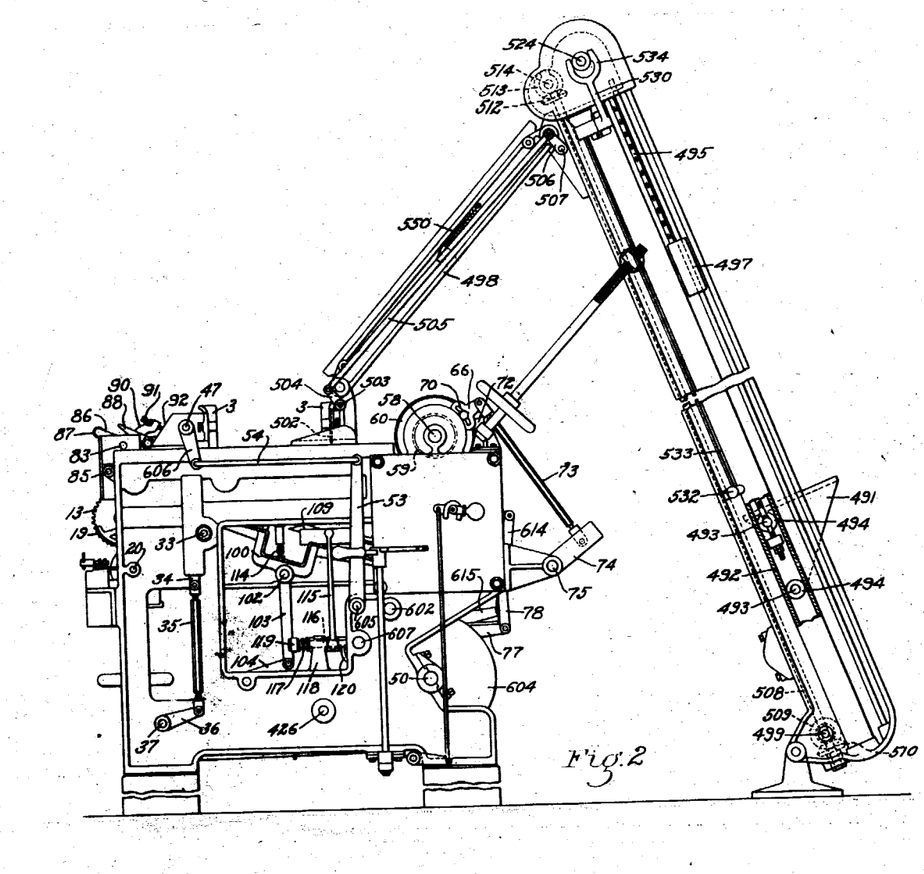
Fig. 2 is a right hand end elevation of the machine shown in Fig. 1, including also the elevator mechanism for carrying the blanks to the holder.

The cam which actuates the yoke levers 100 is so constructed and adjusted that after the blank has been seated on the rolls 110 and pushed back against the edge guide 113, the said yoke levers will be rocked down into the position shown in dotted lines in Fig. 2. A rail 114 extends parallel with the guide rail 112, the upper surface of which is on the same level as the base of the guide rail 112 when the yoke levers are in their lowermost position. See Figs. 1 and 2. This is slightly above the level of the upper surface of the supporting rolls 110 so that when the yoke levers have dropped to their lowest position the blank will be supported by the bases of the edge guides 112 and by the said rails 114. When in this position it is ready to be transferred to a position beneath the forming block that is, to the left as viewed in the plan view, Fig. 1. This will be at right angles to the path of travel which it took in being withdrawn from the stack and pushed onto the supporting rolls 110 mounted on the rocking yoke levers. The forming block is not shown, as the folding mechanism is not claimed in this divisional application, but it lies to the left of the broken end of the rail 114 shown in Fig. 1 and at right angles to said rail.

The means for thus moving the blank will now be described. See Figs. 1, 2, 9 and 10. A lever 115 is mounted fast on a rocker shaft 116 which is journaled in a bracket 118, said lever extending up above one side of the tilting yoke lever supports 100, as shown in Fig. 2. A spring 117 is coiled around said shaft 116, one end being secured to the bracket 118 in which the shaft is journaled, the other end being fast to a collar 119 on the shaft, said spring being under tension. A lever 120 is mounted fast on said shaft 116 and carries a roll which engages with a cam surface on the back side of the sealing lap glue roll cam 604 to rock said shaft 116 at the proper time so as to draw the upper end of lever 115 back, and then when the said roll on the lever 120 rides off of the high part of the cam the spring 117 will rock the shaft 116 back and throw the lever 115 forward. This action is so timed that the forward throw will occur after the tilting yoke levers have dropped down to deposit the blank on the rails 114 and 112, and the result is that the lever 115 will strike the edge of the carton blank a sharp blow and cause it to slide on the rails 114 and 112 far enough to be engaged between upper and lower feed rolls 123 and 124 which carry the blank forward. There should be at least four sets of feed rolls 123, and 124, two sets parallel with each other to grip the blank in its forward shoot from the lever 115, and two more sets farther on toward the folding mechanism to seize the blank after it has been partially advanced by the first set, so as to carry the blank farther along. See Figs. 1, 9 and 10.

In Fig. 1 only one feed roll 123 is shown, namely, the farther upper roll of one set.

Figures 9, 10:
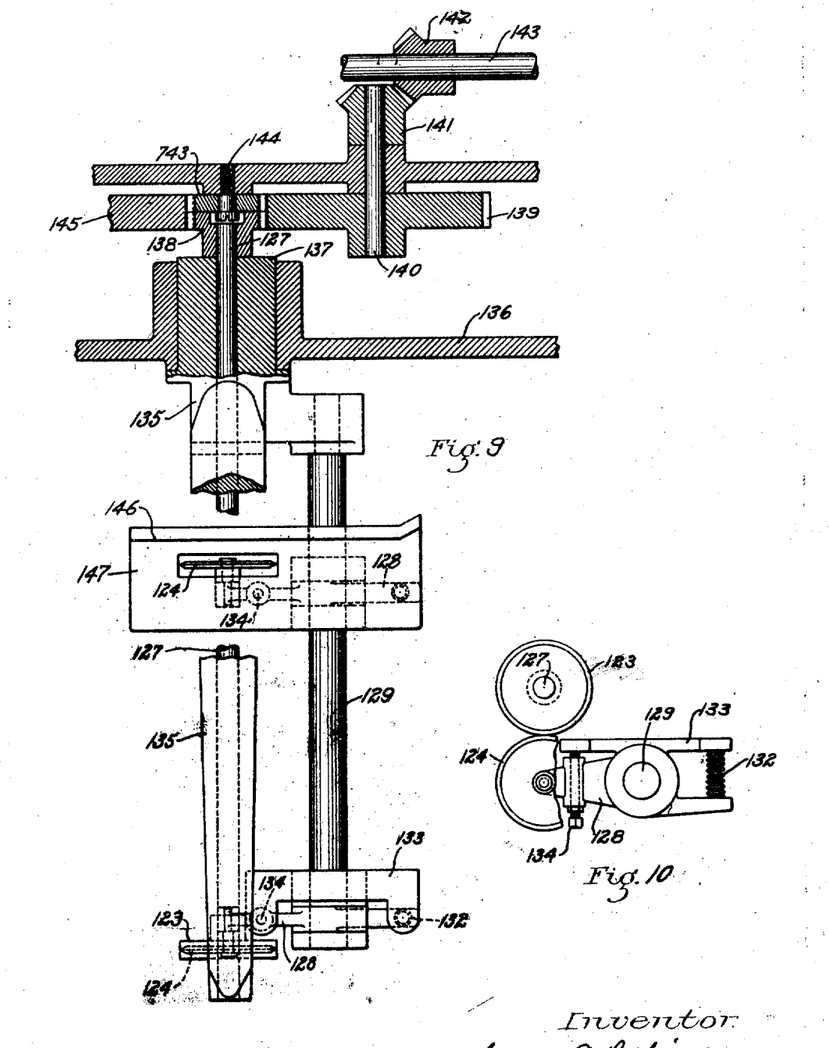
Fig. 9 is a plan partly in section showing the mechanism for transferring the blanks to the forming mechanism.
Fig. 10 is an elevation showing one pair of rollers shown in Fig. 9.

In Fig. 9 one pair of upper and lower feed rolls are shown, and the parts are broken away to show more clearly the lower feed roll of another pair. One set of both upper and lower feed rolls 123 and 124 are shown in detail in Fig. 10. Preferably the upper feed rolls 123 have a flat periphery and the lower feed rolls 124 have a beveled periphery. The upper feed rolls 123 are each mounted on a shaft 127 which is unyielding up and down. The lower feed roll 124 is journaled in a lever 128 which is pivoted on stud 129 mounted in bracket 135. A spring 132 under tension has one end resting on the rear extension of lever 128 and the other end bears against the under side of a bracket 133 mounted on stud 129 thus holding the roll 124 in yielding engagement with the upper feed roll 123. An adjustable stop screw 134 mounted in a boss on lever 128 bears up against one arm of bracket 133 and regulates the upward movement of the roll 124.

The lower feed rolls 124 are driven by friction with the upper feed rolls 123. The shaft 127 which carries the upper feed rolls is journaled in the bracket 135 which is arched over the feed rolls. It is connected with the frame 136 by a boss 137 set into a recess in the frame and can be removed therefrom so as to entirely remove the feed rolls and the guides 112 if for any reason it is desired to remove them to accommodate passage of blanks of exceptional width. A pinion 138 mounted on shaft 127 engages with a gear 139 on shaft 140, said shaft 140 carrying a bevel gear 141 which engages with a bevel gear 142 mounted on shaft 143. See Figs. 1 and 9. A sprocket 131 mounted on shaft 143 is connected by a chain (not shown) with a sprocket (not shown) on shaft 426 (see Fig. 2) whereby the feed rolls 123 are continuously rotated. A pinion 743 mounted on a stud 144 also engages with gear 139 and with a gear 145 whereby movement is transmitted to gear 95 (Fig. 1) on a shaft (not shown) for actuating the second set of feed rolls. Pinion 138 also engages with gear 145, but if pinion 138 together with shaft 139 and the connected parts and feed rolls should be removed, as previously described, the second set of feed rolls will still be actuated by power transmitted through pinion 743.

In the travel of the blank between the feed rolls 123 and 124 the blank is guided at its rear edge by vertical guides 146 similar to the vertical guides 113, said guides 146 rising from horizontal plates 147 which support the blank. The plates 147 are slotted to allow the feed rolls 123 and 124 to engage the blank. (See Figs. 1 and 9.)

After the blank passes off the supporting and guide plates 147 it is delivered onto other supports and is carried to the folding mechanism by means not necessary to describe herein.

Means are provided for automatically supplying blanks to the stack, and the delivery is controlled by the blanks in the stack in such manner that the feeding mechanism will be rendered inactive when the pile in the stack rises above a predetermined height. In the mechanism shown they are raised by an elevator to a height greater than the stack and are then discharged one at a time from the top of the pile on the elevator down an incline into the stack, and the regulating means above mentioned stops the elevating mechanism and the discharge mechanism which discharges from the elevator into the chute when the pile in the stack rises above the predetermined height.

The mechanism will now be described. See Figs. 2, 3, 12-16. The elevator consists of a platform 491 movable in inclined guides 492, being shown as having axles 493 with wheels or rolls 494 which run in guide ways between the guides 492. See Fig. 2. The platform is suspended by chains 495, one end of each chain being attached to the elevator platform, the chain running up over a sprocket 496 (Fig. 16) and having at its other end a weight 497 which takes up the slack in the free end of the chain.

An inclined chute 498 (Figs. 2, 3, 12, 13) extends from the discharge side of the upper end of the elevator well down to a point somewhat above the magazine or holder for the stack of blanks from which they are carried to the former block. At the top of the incline is an abutment 500 over which the topmost blank in the pile on the elevator is fed by a feed roll 501 (Figs. 14 and 16) so that it will tumble down the inclined chute 498. The feed roll 501 and the abutment 500 are spaced apart just enough to allow passage of only one blank at a time. See Fig. 16. Preferably the feed roll has a frictional surface of rubber or some other material. At the foot of the incline 498 a plate or finger 502 is pivoted on a rocker shaft or stud 503 (see Figs. 2 and 3) said finger extending down at one side of the stack of blanks in the holder or magazine, that is, at one side of where the pile of blanks will rise if there are enough in the stack to rise above a predetermined height. The said finger is given a vibratory or oscillating movement, swinging out over the top of the blanks in the stack and back again so long as the pile of blanks do not rise high enough to interfere. When the pile of blanks rises above the predetermined height the finger 502 will strike the edge of the blanks which will thereby stop the vibration, because the frame work of the magazine will prevent the blanks from being pushed out of the magazine. On the same rocker shaft 503 on which the finger 502 is mounted, a lever 504 is also mounted fast and is pivotally connected with one end of a rod 505, the other end of said rod 505 being pivotally connected with a lever 506, which is mounted fast on a rocker shaft 507. Said rocker shaft 507 is connected with mechanism for actuating the same, and also through intermediate mechanism it actuates the feed roll 501 and controls the mechanism for raising the elevator. When the finger 502 is restrained from vibratory movement by its contact with the pile of blanks, the rocker shaft 507 will be prevented from rocking and will stop the elevating and feeding mechanism. This mechanism will now be described.

Figure 14:
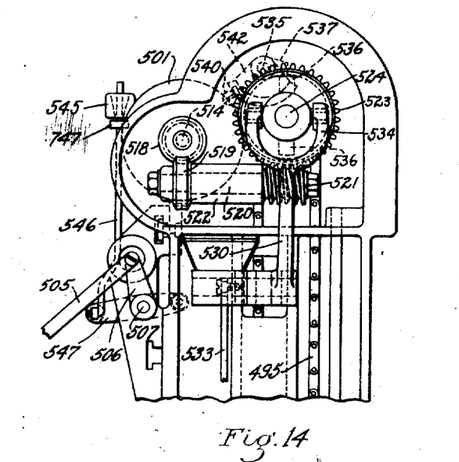
Fig. 14 is a right hand end elevation of the upper part of the elevator mechanism as viewed in Fig. 2.
Figure 15:
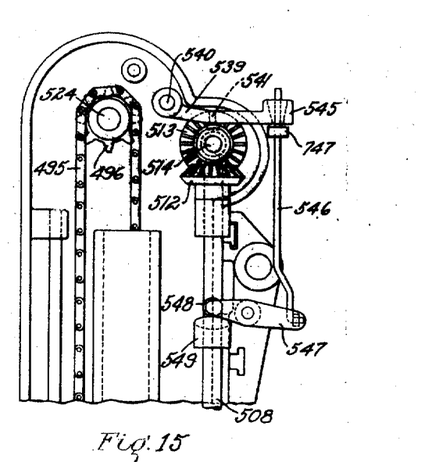
Fig. 15 is a left hand end elevation of the upper portion of the elevator mechanism.
Figure 16:
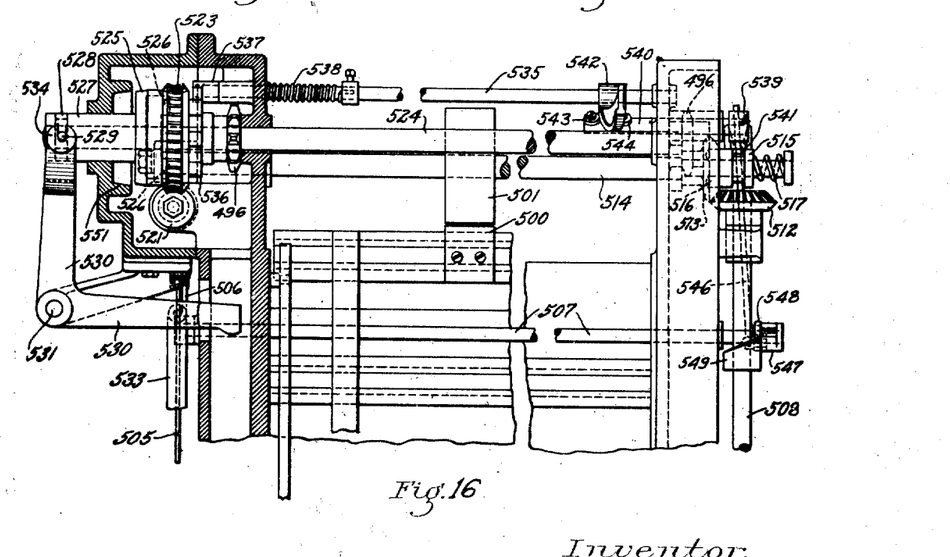
Fig. 16 is a side elevation of the upper portion of the elevator mechanism as viewed from the right hand end of Figs. 2 and 14.

A shaft 508 extends up at an incline alongside of the elevator well in suitable bearings and is in continuous rotation. Figs. 2 and 16. The means shown for giving it the rotation is a bevel gear 509 on shaft 499 which engages with a bevel gear 510 on shaft 508 which is connected with main driving mechanism (not shown). A bevel gear 512 is fast on the upper end of shaft 508 and engages with a bevel gear 513 which is loose on shaft 514 so as to be capable of rotating on said shaft, but is held against longitudinal movement thereon. (Figs. 14, 15, 16). Said shaft 514 is journaled in suitable bearings in the frame. A clutch 515 having an annular groove in its periphery is splined to the shaft 514 in such manner as to be slidable thereon but it rotates therewith. It is provided with pins 516 which project from the face thereof and at right angles thereto and are adapted to engage with slots in the face of the bevel gear 513 and when so engaged the shaft 514 will rotate by means of the continuously rotating shaft 508. A spring 517 tends to keep the clutch in engagement with the bevel gear 513, but at certain times the clutch is thrown out and kept from being moved back.

A worm 518 is mounted on shaft 514 and engages with a worm gear 519 on a shaft 520 journaled in bearings 522 in the frame. See Fig. 14. Said shaft 520 carries a worm 521, and said worm 521 engages with a worm gear 523 which is loose on a shaft 524 so as to be capable of rotating on said shaft 524, but is held against longitudinal movement thereon. A clutch disk 525 is splined to shaft 524 in such manner as to rotate therewith and is slidable thereon. It has two pins 526 which project from the face thereof and at right angles thereto, and are adapted to engage with slots in the face of the worm gear 523. When the clutch is thus engaged the shaft 523 will be rotated by shaft 514 and the intermediate mechanism, provided shaft 514 is rotating. On account of the variation in diameter of the connecting gearing the shaft 524 will rotate at a less speed than the shaft 514. The clutch 525 is provided with a hub 527 formed with an annular groove in which is a collar 528 which has pins 529 engaging with the fork 534 of one arm of a bell crank lever 530. Said lever 530 is mounted on shaft 531, and by rocking said lever the said clutch 525 may be moved into and out of engagement with the worm gear 523. This lever 530 can be operated by means of a hand lever 532 which is pivotally connected with one end of a rod 533, the other end of said rod being pivotally connected with one arm of bell crank 530. (See Figs. 2, 14, 16).

A rocker shaft 535 is journaled in bearings in the frame of the machine. A plurality of pins 536, preferably four in number as shown, project from the face of the worm gear 523, at right angles thereto, and are disposed at equal distances from each other. A lever 537 is mounted fast on said shaft 535 and projects down into the path which the pins 536 describe when the worm gear 523 rotates. When the worm gear 523 rotates, and one of the pins 536 engages the lever 537 it will rock the shaft 535. A torsion spring 538 on said shaft has one end fast to a collar on the shaft and the other end fast to the frame so that when the shaft is rotated by the worm gear 523 as above described it will give tension to the spring 538 which will tend to recoil and will rotate the shaft back again when the shaft is permitted to yield to the spring.

A lever 539 is fulcrumed at one end on a stud 540, so as to rock in a vertical plane, said stud being itself slidable longitudinally in a horizontal direction in bearings in the frame. Said lever 539 carries a pin 541 which is adapted to engage with the annular groove in the clutch 515. See Figs. 15, 16. When said pin is in engagement with the groove in the clutch, if the stud 540 is moved longitudinally it will move the clutch into or out of engagement with the bevel gear 513, according to the direction of movement, and thereby give rotation to shaft 514 or stop its rotation, as the case may be.

The sliding movement of the stud 540 is given by a cam-faced arm 542 which is mounted on shaft 535 and engages between two rolls 543, 544 fixed to the stud 540. When the shaft 535 rotates in a direction to turn up the toe of the cam-faced arm 542 as viewed in Fig. 16 the engagement of the cam with the roll 543 will cause the stud 540 to move toward the left as viewed in said Fig. 16, and when it rocks in the reverse direction the other side of the cam will by engagement with the roll 544 cause the stud 540 to move to the right. The pin, however, is lifted out of the groove before the movement of the stud 540 to the left, and the spring 517 then throws the clutch into engagement.

The means for lifting the lever 539 is as follows: The said lever 539 has at the end opposite its fulcrum end a lug 545 formed with a vertical flaring aperture through which passes a rod 546 which is vertically reciprocable and carries a collar 747 which when the rod 546 moves up will engage the lug 545 and lift that end of the lever 539 and disengage the pin 541 from the annular groove in the clutch. The aperture in the lug through which the rod 546 passes is made flaring to allow proper play for the rod and for the rocking of the lever. The lower end of the rod 546 is connected with one arm of a lever 547 mounted fast on rocker shaft 507, the other arm of said lever 547 carrying a roll 548 which engages with a cam 549 mounted on shaft 508, thereby giving a continuous rocking movement to the lever 547.

The clutch 525 is made cone shaped with tapering sides, which are adapted to fit into a cone-shaped recess 551 in the case sufficiently tight so that when the clutch is pulled back by means of the lever 530 out of engagement with the worm gear 523 into said recess 551 the walls of said recess will form a frictional brake on the clutch when the shaft 524 is allowed to rotate. When the elevator has reached the top of its movement and it is desired to allow it to descend to be filled up again with blanks the clutch 525 will be thus disengaged by means of the hand lever, and the weight of the elevator will be sufficient to cause it to descend, thereby rotating the shaft 524 backward and the walls of said recess 551 will, as above described, constitute a brake to retard the rapid descent of the elevator.

Assuming that the clutch 515 is in engagement with the bevel gear 513 by means of the pins 516, the shaft 508 which is constantly rotating will rotate the shaft 514 and thereby through the worm 518, worm gear 519, shaft 520 and worm 521, rotate the worm gear 523 on shaft 524, and if the clutch 525 has been engaged with the worm gear 523, shaft 524 will be caused to rotate also, thereby rotating the sprocket wheels 496 and raising the elevator. The rotation of the shaft 514 will cause the feed wheel 501 to rotate and feed the blank down the chute 498, and the rotation of the shaft 524 will cause the elevator to bring another blank up into position to be engaged by the feed roll 501.

When during the rotation of the worm gear 523 which, as already described, is slower than the rotation of the shaft 514, one of the pins 536 projecting from the worm gear 523 engages with the lever 537, said lever 537 will be rocked up, thereby turning the shaft 535 against the tension of the spring 538 and turning up the toe of the cam 542. This is the position shown in Figs. 14, 15 and 16 of the drawings, one of the pins 536 being just about ready to ride away from engagement with the lever 537. As soon as the worm gear 523 has moved a little past the position shown in Figs. 14 and 16 and far enough to release the pin 536 from the lever 537, the torsion of the spring 538 will cause the shaft 535 to rock back, thereby causing that face of the cam 542 which is in engagement with the roll 544 to push the stud 540 to the right of the position shown in Fig. 16 and, by reason of the engagement of the pin 541 with the annular groove in the clutch 515, the clutch 515 will be moved to the right, disengaging the clutch from the bevel gear 513 and compressing the spring 517 so that now the shafts 514 and 524 will be brought to a standstill.

A spring 550 has one end fast to the rod 505 and the other end fast to the chute. When the rod 505 is in its downward position the spring is under tension. When the shaft 508 has rotated far enough to bring the low part of the cam 549 into engagement with the roll 548 on lever 547 the spring 550 will contract, thereby causing the rod 505 to move up and rock the shaft 507. This will turn the lever 547 in a direction for the roll 548 to follow down on the low part of the cam 549 and for the left arm of the lever 547 viewed in the direction of Fig. 14 to turn up, thereby lifting the rod 546 and the lever 539 and thereby raising the pin 541 out of the annular groove in the clutch 515. The clutch 515 will then be free to respond to the expansion of the spring 517 and throw the clutch back into engagement with the bevel gear 513 so that the shafts 514 and 524 will again begin to revolve and operate the feed roll 501 and the elevator. At the beginning of this new rotary movement of the shaft 514 the stud 540 will be left in its right-hand position to which it was carried by the backward rocking movement of the cam 542, the lever 539 being in its turned-up position, holding the pin 541 above the annular flange of the clutch 514. As soon, however, as the worm gear 523 has rotated far enough for one of the pins 536 to turn up the lever 537 the shaft 535 will be rocked in a direction to carry the toe of the cam 542 forward and up so as to slide the stud 540 to the left and to bring the pin 541 directly in alinement with the annular groove in the clutch 515, but still held above the groove. As soon as the high part of the cam 549 has come into engagement with the roll 548 on the lever 547, said lever 547 will be rocked in a direction to pull down the rod 546 and allow the pin 541 to drop into the annular groove in the clutch 515. The lever 539 being fulcrumed at one end on the stud 540, the other end of said lever being free to rise and fall as allowed by the loose play of the rod 546 in the slot in the boss 545 of said lever, gravity will be sufficient to cause said lever 539 to drop down in the manner above described and the operation will be continued.

Assuming, however, that the pile of blanks in the stock has risen high enough to prevent the finger 502 from swinging, then the connecting rod 505 will be unable to respond to the pull of the spring 550 to pull up the rod 505. Therefore, after the stud 540 has been pulled to the right by the cam 542 and the clutch has been disengaged, the lever 506 will be prevented from rocking in a direction to cause the rocker shaft 507 to turn the lever 547 in a direction to lift the rod 546 to disengage the pin 541 from the annular groove in the clutch 515. In such case the clutch will not be free to respond to the pull of the spring 517 and therefore the clutch will remain disengaged from the bevel gear 513 until such time as the pile of blanks in the stack has become lowered sufficiently to allow the finger 502 to swing forward.

When the stud 540 slides in either one direction or the other, the lever 539 which is fast to said stud will move with it broadside, although it has the rocking movement up and down. For this reason the vertical rod 546 is loosely connected with the lever 547 in such manner that it can rock on its axis in a vertical plane.

What I claim is:

1. In a machine for feeding carton blanks, a magazine to hold a stack of blanks, a movable separator device which enters between the lowermost blank and the superposed stack of blanks, and separates the superposed stack at the edge thereof from said lowermost blank, reciprocable gripping mechanism which is normally away from the magazine while the separator is moving forward, means which move the gripping mechanism bodily forward and cause it to grip the lowermost blank after the superposed stack has been separated therefrom and to then move the gripping mechanism away from the magazine, pulling the said lowermost blank therefrom, and means which control the movement of the separator and the movement of the gripping jaws with relation to each other in such manner that the separator will be moved into separating engagement with the superposed stack before the gripping jaws move into engagement with the lowermost blank and will be moved backward after the gripping jaws have pulled the lowermost blank from the stack.

2. In a machine for feeding carton blanks, a magazine to hold a stack of blanks, means for withdrawing the blanks from the bottom of the stack one at a time, each blank withdrawn being always the lowermost blank in the stack for the time being, means for supplying blanks to the top of the stack, and means whereby the height of the stack of blanks in the magazine controls the actuation of the supply.

3. In a machine for feeding carton blanks, a magazine to hold a stack of blanks superposed upon one another in registration with each other, means for extracting the blanks from the stack one at a time, each blank withdrawn being always the lowermost blank in the stack for the time being, means for supplying blanks to the top of the stack, and means whereby the height of the stack of blanks in the magazine controls the actuation of the supply.

4. In a machine for feeding carton blanks, a magazine to hold a stack of blanks, a pair of gripping jaws, means for moving the said jaws toward and from the stack, means for causing the gripping jaws to seize one of the blanks in the magazine when it moves forward and to withdraw the blank when it moves backward, and cutting means connected with said jaws to slit the blank when the jaws close upon the blank.

5. In a machine for feeding carton blanks, a magazine to hold a stack of blanks, means for withdrawing blanks from the magazine, a source of supply for keeping the magazine supplied with blanks, an inclined chute rising above the magazine, and down which the blanks are delivered from said source of supply to the magazine, and means controlled by the blanks in the magazine so constructed and arranged that if the stack in the magazine rises above a predetermined height the delivery of the blanks to said inclined chute will be checked.

6. In a machine for feeding carton blanks, a magazine to hold a stack of blanks, means for withdrawing blanks from the magazine, a source of supply for keeping the magazine supplied with blanks, an inclined chute rising above the magazine, and down which the blanks are delivered from said source of supply to the magazine, means for selecting one blank at a time from said source of supply and causing it to pass down said inclined chute to said magazine, and means controlled by the blanks in the magazine so constructed and arranged that if the stack in the magazine rises above a predetermined height the delivery of the blanks to said inclined chute will be checked.

7. In a machine for feeding carton blanks, a magazine to hold a stack of blanks in such manner that the flap ends of the blanks project out of the magazine, a gluing device, means for moving the gluing device across the under face of a portion of the projecting part of the lowermost blank, thus causing the said projecting portion to bend slightly downward, said gluing device then moving away from engagement with the said lowermost blank, a movable separator device which enters between the said bent down portion of the lowermost blank and the superposed blanks and slightly lifts the projecting ends of the superposed blanks, and movable gripping mechanism which moves bodily toward the bent down portion of the lowermost blank and seizes it, and then bodily retreats, withdrawing the said blank from the magazine.

8. In a machine for feeding carton blanks, a magazine to hold a stack of blanks in such manner that the flap ends of the blanks project out of the magazine, a gluing device, means for moving the gluing device across the under face of the projecting part of the lowermost blank for a portion only of its width, thus causing the said projecting portion to bend slightly downward, said gluing device then moving away from engagement with the said lowermost blank, a movable separator device which enters between the said bent down portion of the lowermost blank and the superposed blanks and slightly lifts the projecting ends of the superposed blanks, and movable gripping mechanism which moves toward the bent down portion of the lowermost blank and grips an un-glued portion only of the bent down flap of said lowermost blank and withdraws said blank out of the stack.

9. In a machine for feeding carton blanks, a magazine to hold a stack of blanks in such manner that the flap ends of the blanks project out of the magazine, a convex faced gluing pad, means for actuating said gluing pad in such manner that the convex face moves over a portion only of the width of the under face of the projecting portion of the lowermost blank in the stack and thereby causes said projecting portion of the lowermost blank to bend downward from the superposed blanks, the projecting portion being left unglued for a portion of its width, a movable separator device, means for moving said separator device in such manner as to cause it to enter between the downwardly bent portion of the said lowermost blank and the superposed stack of blanks and lift the ends of the superposed blanks, gripping jaws and means for actuating said gripping jaws to move forward and seize the downwardly bent portion of the said lowermost blank at an unglued portion thereof and then to move backward and pull the said lowermost blank out of the magazine.

10. In a machine for feeding blanks, a magazine to hold a stack of blanks in superposed relation to each other, reciprocable gripping mechanism, means for reciprocating the jaws toward and from the lowermost blank in the stack, means for causing the jaws to grip the lowermost blank at the end of a forward movement, means for causing the jaws to move back far enough to withdraw the blank from the stack and then move forward again while still gripping the blank, and means for causing the jaws to release the blank after it is carried forward a predetermined distance.

In testimony whereof I affix my signature, in presence of two witnesses.

GEORGE A. ROBINSON.

Witnesses:
WILLIAM A. COPELAND,
ALICE H. MORRISON.